United States Patent
Ye et al.

(10) Patent No.: US 11,321,659 B2
(45) Date of Patent: May 3, 2022

(54) DYNAMICALLY ROUTING SALVAGE SHIPMENTS AND ASSOCIATED METHOD

(75) Inventors: Jian Ye, Canton, MA (US); Keith Whalen, Hampton, NH (US); Mark J. Bateman, East Bridgford (GB); Rob E. Moore, Mississauga (CA)

(73) Assignee: Blue Yonder Group, Inc., Scottsdale, AZ (US)

( * ) Notice: Subject to any disclaimer, the term of this patent is extended or adjusted under 35 U.S.C. 154(b) by 517 days.

(21) Appl. No.: 12/427,897

(22) Filed: Apr. 22, 2009

(65) Prior Publication Data
US 2009/0271236 A1    Oct. 29, 2009

Related U.S. Application Data

(60) Provisional application No. 61/047,887, filed on Apr. 25, 2008.

(51) Int. Cl.
*G06Q 30/02*    (2012.01)
*G06Q 10/08*    (2012.01)

(52) U.S. Cl.
CPC ........... *G06Q 10/08* (2013.01); *G06Q 10/083* (2013.01)

(58) Field of Classification Search
CPC ..................................................... G06Q 30/02
USPC ..... 705/330, 332, 33, 7.11, 7.12, 7.22, 7.23, 705/7.25, 331
See application file for complete search history.

(56) References Cited

U.S. PATENT DOCUMENTS

| | | | |
|---|---|---|---|
| 2007/0170100 A1* | 7/2007 | Rogan | B07B 13/003 209/632 |
| 2008/0010174 A1* | 1/2008 | Hiroshige | G06Q 10/08 705/28 |
| 2008/0077464 A1* | 3/2008 | Gottlieb et al. | 705/8 |
| 2009/0007525 A1* | 1/2009 | Lewis | G06Q 30/02 53/474 |

FOREIGN PATENT DOCUMENTS

| | | | |
|---|---|---|---|
| JP | 3641456 B2 | * | 4/2005 |
| JP | 2005274622 A | * | 10/2005 |

OTHER PUBLICATIONS

Campbell, J. F, A. T Ernst, and M Krishnamoorthy. "Hub Arc Location Problems: Part I—Introduction and Results." Management science 51.10 (2005): 1540-1555. Web. (Year: 2005).*

* cited by examiner

*Primary Examiner* — Akiba K Robinson
(74) *Attorney, Agent, or Firm* — Spencer Fane LLP; Steven J. Laureanti

(57) ABSTRACT

A system and method is disclosed for managing salvage shipments in a transportation network. The system includes a transportation planner coupled with one or more entities in the transportation network. The transportation planner determines an optimized transportation plan for delivery and pick-up of shipments throughout the transportation network.

17 Claims, 2 Drawing Sheets

DYNAMICALLY ROUTING SALVAGE SHIPMENTS AND ASSOCIATED METHOD

CROSS-REFERENCE TO RELATED APPLICATIONS

The present invention is related to that disclosed in U.S. Provisional Patent Application Ser. No. 61/047,887, filed 25 Apr. 2008, entitled "Dynamically Routing Salvage Orders and Associated Method." U.S. Provisional Patent Application Ser. No. 61/047,887 is assigned to the assignee of the present application. The subject matter disclosed in U.S. Provisional Patent Application Ser. No. 61/047,887 is hereby incorporated by reference into the present disclosure as if fully set forth herein. The present invention hereby claims priority under 35 U.S.C. § 119(e) to U.S. Provisional Patent Application Ser. No. 61/047,887.

TECHNICAL FIELD OF THE INVENTION

This invention relates generally to transportation management, and more particularly to dynamically routing salvage equipment and an associated method.

BACKGROUND OF THE INVENTION

In fleet operations, a transportation vehicle (i.e., trucks, trailers, and the like) starts at a distribution center and travels outbound from the distribution center to make deliveries to various entities. The deliveries typically contain regular shipments which are packaged and delivered on salvage equipment (i.e., cages, containers, pallets, or other like equipment). The fleet operations require the transportation vehicle to pick-up the salvage equipment once the entity separates the salvage equipment from the regular shipments. However, the next time a transportation vehicle makes a delivery to the entity, the empty salvage equipment is required to be picked-up by the transportation vehicle. The empty salvage equipment is different from regular shipments, because the empty salvage equipment does not have to be dropped at a particular location, but can be dropped at any location, such as, for example, a distribution center, a dekit location or some other designated location.

However, the fleet operations have various time constraints, such as, for example, a driver's shift, the capacity of a transportation vehicle and other like constraints that make it infeasible to pick-up the empty salvage equipment without violating the fleet operation's time constraints Violating the fleet operation's time constraints is undesirable.

SUMMARY OF THE INVENTION

A system for managing salvage shipments in a transportation network is disclosed. The system includes a transportation planner coupled with one or more entities in the transportation network. The transportation planner determines an optimized transportation plan for delivery and pick-up of shipments throughout the transportation network.

A method for managing salvage shipments in a transportation network is also disclosed. The method provides for accessing transportation data associated with the transportation network and accessing constraints associated with the transportation network. The method further provides for modeling a transportation problem for the transportation network, based on at least a portion of the accessed transportation data and constraints. The method still further provides determining an initial hub assignment based on one or more entities within the transportation network. The method yet further provides for optimizing the initial hub assignment by generating multiple solutions of the initial hub assignment and generating an optimized transportation plan by merging the multiple solutions of the initial hub assignment.

A computer-readable storage media embodied with software for managing salvage shipments in a transportation network is also disclosed. The computer-readable storage media provides software for accessing transportation data associated with the transportation network and accessing constraints associated with the transportation network. The computer-readable storage media further provides software for modeling a transportation problem for the transportation network, based on at least a portion of the accessed transportation data and constraints. The computer-readable storage media still further provides software for determining an initial hub assignment based on one or more entities within the transportation network. The computer-readable storage media yet further provides software for optimizing the initial hub assignment by generating multiple solutions of the initial hub assignment and generating an optimized transportation plan by merging the multiple solutions of the initial hub assignment.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION OF THE INVENTION

Reference will now be made to the following detailed description of the preferred and alternate embodiments. Those skilled in the art will recognize that the present invention provides many inventive concepts and novel features, that are merely illustrative, and are not to be construed as restrictive. Accordingly, the specific embodiments discussed herein are given by way of example and do not limit the scope of the present invention.

Figure 1:
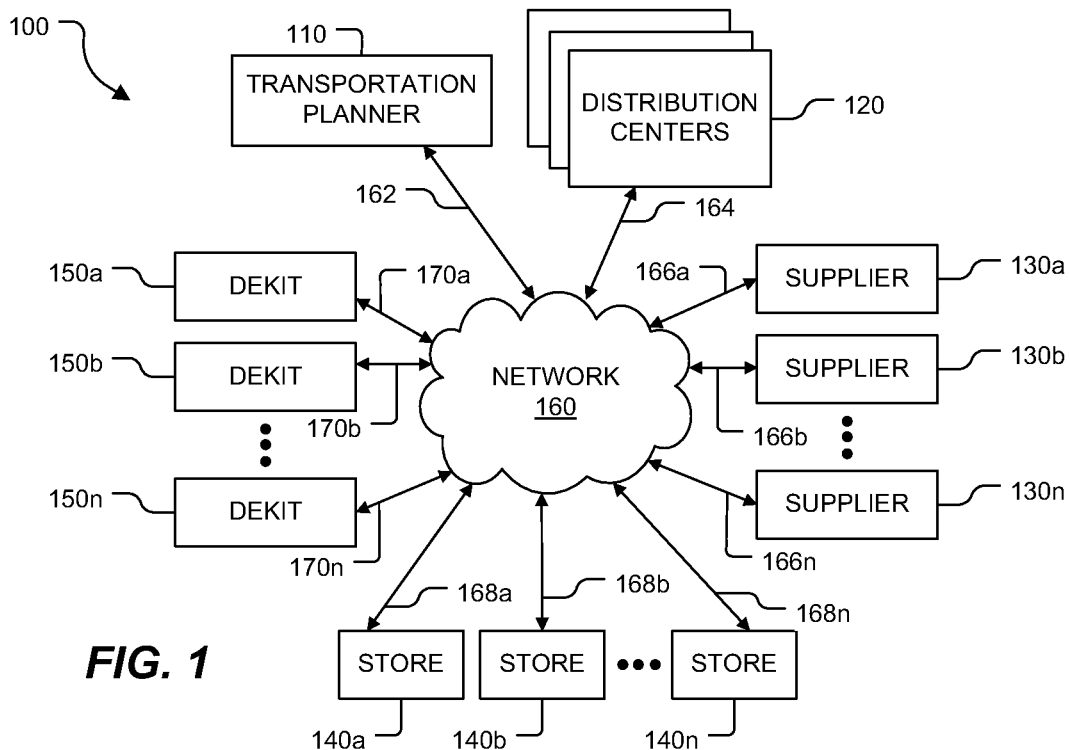
FIG. 1 illustrates an exemplary transportation network according to a preferred embodiment.

FIG. 1 illustrates an exemplary transportation network 100 for managing salvage shipments in accordance with a preferred embodiment. Transportation network 100 comprises a transportation planner 110, one or more distribution centers 120, one or more suppliers 130*a*-130*n*, one or more stores 140*a*-140*n*, one or more dekit locations 150*a*-150*n*, a network 160, and communication links 162, 164, 166*a*-166*n*, 168*a*-168*n*, and 170*a*-170*n*. Although a single transportation planner 110, one or more distribution centers 120, one or more suppliers 130*a*-130*n*, one or more stores 140*a*-140*n*, and one or more dekit locations 150*a*-150*n* are shown and described, embodiments contemplate any number of transportation centers 110, any number of distribution centers 120, any number of suppliers 130*a*-130*n*, any number of stores 140a-140n, any number of dekit locations 150a-150n, or any number of networks 160, according to particular needs.

In one embodiment, one or more distribution centers 120 may include manufacturers such as original equipment manufacturers (OEMs), component manufacturers or suppliers, distributors, wholesalers, retailers, or any other entity that provides transportation of items to and/or from other distribution centers 120, suppliers 130a-130n, stores 140a-140n, dekit locations 150a-150n, or any other entity. In another embodiment, transportation network 100 may operate on one or more computers that are integral to or separate from the hardware and/or software that support transportation planner 110, one or more distribution centers 120, one or more suppliers 130a-130n, one or more stores 140a-140n, one or more dekit locations 150a-150n, and network 160. The one or more computers may include any suitable input device, such as a keypad, mouse, touch screen, microphone, or other device to input information. In addition, the one or more computers may include any suitable output device which may convey information associated with the operation of transportation network 100, including digital or analog data, visual information, or audio information.

In addition, or as an alternative, the one or more computers may include fixed or removable computer-readable storage media, such as magnetic computer disks, CD-ROM, wireless ports and connections, or other suitable computer-readable storage media to receive output from and provide input to transportation network 100. Furthermore, the one or more computers may include one or more processors and associated memory to execute instructions and manipulate information according to the operation of transportation network 100. Accordingly, transportation planner 110, one or more distribution centers 120, one or more suppliers 130a-130n, one or more stores 140a-140n, one or more dekit locations 150a-150n, and network 160 may each operate on one or more separate computers, or may operate on one or more shared computers. Each of these one or more computers may be a work station, personal computer (PC), network computer, notebook computer, personal digital assistant (PDA), cell phone, telephone, wireless data port, or any other suitable computing device.

Although one or more distribution centers 120, one or more suppliers 130a-130n, one or more stores 140a-140n, and one or more dekit locations 150a-150n are shown and described as coupled with transportation planner 110, embodiments contemplate one or more distribution centers 120, one or more suppliers 130a-130n, one or more stores 140a-140n, and one or more dekit locations 150a-150n interacting with one another through multiple transportation planners 110. For example, multiple transportation planners 110 may be provided for various geographical regions, such as, for example, a regional transportation planner, a domestic transportation planner, an international transportation planner, or other like transportation planners. Although multiple transportation planners 110 are described herein, embodiments contemplate any suitable transportation planner capable of communicating with one or more distribution centers 120, one or more suppliers 130a-130n, one or more stores 140a-140n, and one or more dekit locations 150a-150n. In addition, or as an alternative, one or more distribution centers 120, one or more suppliers 130a-130n, one or more stores 140a-140n, and one or more dekit locations 150a-150n may interact with transportation planner 110 autonomously or according to input from one or more user computers associated with one or more distribution centers 120, one or more suppliers 130a-130n, one or more stores 140a-140n, and one or more dekit locations 150a-150n.

In one embodiment, transportation planner 110 is coupled with network 160 using communications link 162, which may be any wireline, wireless, or other link suitable to support data communications between transportation planner 110 and network 160 during operation of transportation network 100. One or more distribution centers 120 is coupled with network 160 using communications link 164, which may be any wireline, wireless, or other link suitable to support data communications between one or more distribution centers 120 and network 160 during operation of transportation network 100. One or more suppliers 130a-130n are coupled with network 160 using communication links 166a-166n, which may be any wireline, wireless, or other link suitable to support data communications between one or more suppliers 130a-130n and network 160 during operation of transportation network 100. One or more stores 140a-140n are coupled with network 160 using communication links 168a-168n, which may be any wireline, wireless, or other link suitable to support data communications between one or more stores 140a-140n and network 160 during operation of transportation network 100. One or more dekit locations 150a-150n are coupled with network 160 using communication links 170a-170n, which may be any wireline, wireless, or other link suitable to support data communications between one or more dekit locations 150a-150n and network 160 during operation of transportation network 100.

Although communication links 162, 164, 166a-166n, 168a-168n, and 170a-170n are shown as generally coupling transportation planner 110, one or more distribution centers 120, one or more suppliers 130a-130n, one or more stores 140a-140n and one or more dekit locations 150a-150n with network 160, transportation planner 110, one or more distribution centers 120 one or more suppliers 130a-130n, one or more stores 140a-140n, and one or more dekit locations 150a-150n may communicate directly with transportation planner 110, one or more suppliers 130a-130n, and one or more stores 140a-140n, according to particular needs.

In another embodiment, network 160 includes the Internet and any appropriate local area networks (LANs), metropolitan area networks (MANS), or wide area networks (WANs) coupling transportation planner 110, one or more distribution centers 120, one or more suppliers 130a-130n, one or more stores 140a-140n, and one or more dekit locations 150a-150n. For example, data may be maintained by transportation planner 110 at one or more locations external to one or more distribution centers 120, one or more suppliers 130a-130n, one or more stores 140a-140n, and one or more dekit locations 150a-150n and made available to one or more associated user computers of one or more distribution centers 120, one or more suppliers 130a-130n, one or more stores 140a-140n, and one or more dekit locations 150a-150n using network 160 or in any other appropriate manner. Those skilled in the art will recognize that the complete structure and operation of communication network 160 and other components within transportation network 100 are not depicted or described. Embodiments may be employed in conjunction with known communications networks and other components.

Figure 2:
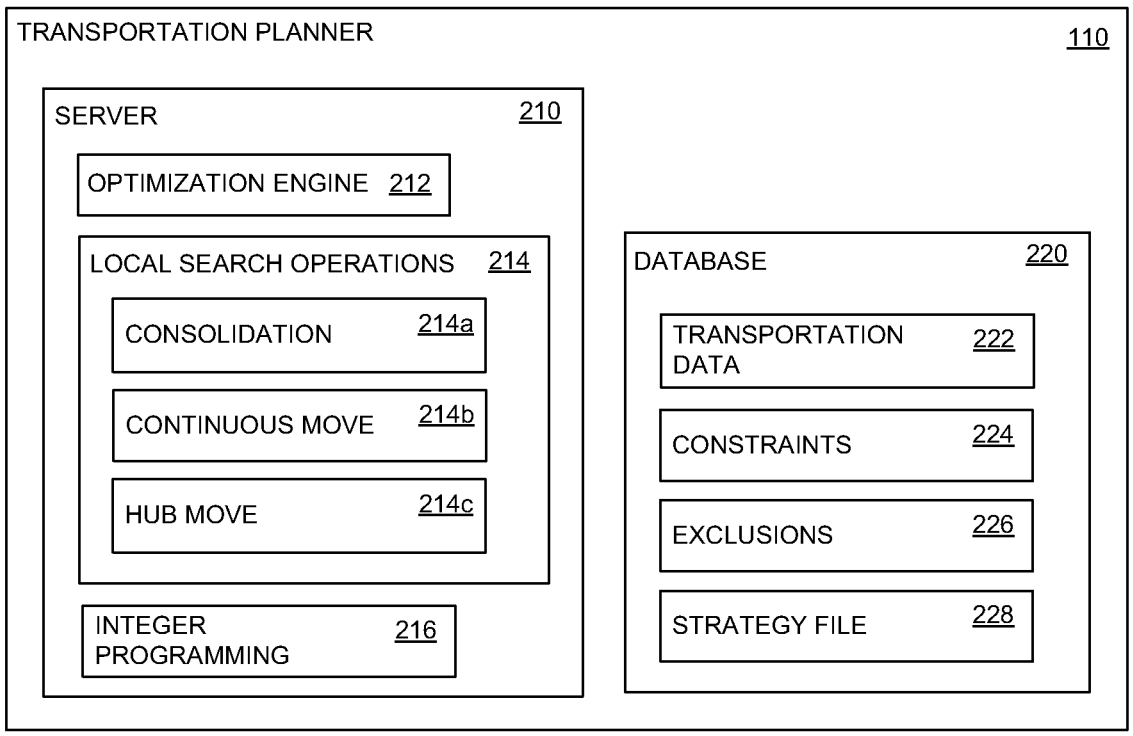
FIG. 2 illustrates the transportation planner of FIG. 1 in greater detail in accordance with the preferred embodiment.

FIG. 2 illustrates transportation planner 110 of FIG. 1 in greater detail in accordance with the preferred embodiment. Transportation planner 110 comprises a server 210 coupled with a database 220. Transportation planner 110, and in particular, server 210, stores transportation data including various constraints, exclusions and/or restrictions associated with transportation network 100, in database 220.

As discussed above, transportation planner 110 comprises one or more computers at one or more locations including associated input devices, output devices, computer-readable storage media, processors, memory, and/or other components for receiving, processing, storing, and communicating information according to the operation of transportation network 100. In addition, or as an alternative, transportation planner 110 may operate on one or more computers that are integral to or separate from one or more distribution centers 120. For example, transportation planner 110 may be integral to each of the one or more distribution centers 120 or may be separate from each of the one or more distribution centers 120.

Server 210 manages applications that generate an optimized transportation plan for delivery and/or pick-up of regular shipments and salvage equipment at one or more distribution centers 120, one or more suppliers 130a-130n, one or more stores 140a-140n, and one or more dekit locations 150a-150n of transportation network 100. As discussed in more detail below, server 210 comprises an optimization engine 212 for generating an optimized transportation plan of a dynamic hub routing problem associated with transportation network 100. As an example only and not by way of limitation, optimization engine 212 runs local search operations 214 to solve various constraints, exclusions and/or restrictions associated with, or applied to transportation network 100. Although server 210 is shown and described as comprising optimization engine 212, embodiments contemplate any suitable engine or combination of engines, according to particular needs.

Database 220 comprises one or more databases or other data storage arrangements at one or more locations, local to, or remote from, server 210. Database 220 includes, for example, transportation data 222, constraints 224, exclusions 226, and strategy file 228. Database 220 stores transportation data associated with transportation network 100 into transportation data 222 that may be used by server 210 in generating an optimized transportation plan.

Transportation data 222 may be, for example, data that describes the locations and business hours of one or more distribution centers 120, one or more suppliers 130a-130n, one or more stores 140a-140n, and one or more dekit locations 150a-150n. In addition, transportation data may be data that describes the shipments and/or capacity of a transportation vehicle to be optimized, the transportation costs and rates, carriers, lanes and other like transportation data. Although, transportation data has been described as particular transportation data, embodiments contemplate any transportation data or combination of transportation data associated with, or applied to transportation network 100.

Constraints stored in constraints 224 may include constraints that are associated with, or applied to transportation network 100, and may prevent a transportation vehicle from mixing the salvage equipment with the regular shipments. In addition, or as an alternative, constraints 224 may include constraints where capacity in a transportation vehicle is required primarily for regular shipments, including pick-ups at one or more suppliers 130a-130n; otherwise, for example, the transportation vehicle may be filled with only empty salvage equipment. Although, constraints have been described as particular constraints, embodiments contemplate any constraint or combination of constraints associated with, or applied to transportation network 100.

Exclusions stored in exclusions 226 may include, for example, a commodity exclusion so that regular shipments may not go through one or more of the distribution centers 120, suppliers 130a-130n, stores 140a-140n, and/or dekit locations 150a-150n. In addition, exclusions 226 may be, for example, a hub commodity exclusion, such that the salvage equipment is only routed through one or more dekit locations 150a-150n and regular shipments are not routed through one or more dekit locations 150a-150n. Although, exclusions have been described as particular exclusions, embodiments contemplate any exclusion or combination of exclusions associated with, or applied to transportation network 100.

Data stored in strategy file 228 may include, for example, data that describes different configurations, different hub assignments, different local search operation orders, associated with one or more of the distribution centers 120, suppliers 130a-130n, stores 140a-140n, and/or dekit locations 150a-150n. In addition, strategy file 228 provides various parameters for modeling an initial hub assignment, as discussed in more detail below. Although, strategy file data has been described as particular strategy file data, embodiments contemplate any strategy file data or combination of strategy file data associated with, or applied to transportation network 100.

In one embodiment, server 210 models salvage shipments associated with transportation network 100 as a dynamic hub routing problem, wherein any location that a transportation vehicle is able to deliver salvage equipment to, may be modeled as a hub. Server 210 formulates this problem as a dynamic hub routing problem, providing for hub evidence and consolidation and continuous move evidence, in order to solve this problem, as discussed in more detail below. Accordingly, the choice of a destination may be modeled dynamically, which may depend on the geography of transportation network 100 and other shipments and/or orders within transportation network 100, to allow delivery based on an optimized transportation plan.

In addition, or as an alternative, optimization engine 212 models one or more distribution centers 120, one or more suppliers 130a-130n, one or more stores 140a-140n, and one or more dekit locations 150a-150n of transportation network 100, as one or more hubs (i.e., in terms of software entities). In addition, optimization engine 212 models a virtual hub as a destination for the salvage equipment. Optimization engine 212 models the virtual hub as any location, but the virtual location does not have to be modeled as a physical location. In addition, optimization engine 212 models distance from the virtual location to any of the one or more dekit locations 150a-150n as zero, while the distance (i.e., transit time) to any of the other locations is modeled as infinity.

Thus, the salvage equipment may not be routed directly from their origin to their virtual destination, but must go through one of one or more dekit locations 150a-150n, which as discussed above is modeled as a hub. In addition, or as an alternative, a hub may be modeled as a commodity exclusion, which as discussed above is stored in exclusions 226, such that regular shipments do not go through these hubs. In addition, optimization engine 212 may model a commodity code, such that regular modeled hubs may not be used for salvage equipment and regular shipments may not go through the one or more modeled dekit hubs.

To further explain the operation of transportation planner 110, an example is now given. In the following example, server 210 models a virtual location V as the destination of all salvage equipment, and models each of the possible one or more dekit locations 150a-150n as a hub H. In addition, the distances from virtual location V to any hub H is modeled as zero and the distance from V to any other location is modeled as infinity. Accordingly, as discussed above, salvages equipment is modeled to be routed through one of the one or more modeled dekit hubs. However, as discussed above, optimization engine 212 models hub commodity exclusions such that salvage equipment is only routed through the one or more modeled dekit hubs and regular shipments are only routed through the one or more modeled regular hubs.

In an embodiment, the modeling of the dynamic hub routing problem provides that the Salvage equipment may only be routed through one hub, that the transportation costs are modeled as zero from any dekit hub H to virtual location V, and a merge-in-transit group is modeled to force the transportation vehicle to pick up salvage equipment. For example, the merge-in-transit group may be a type of shipment group that requires all shipments within the same merge-in-transit group to be on the same load (transportation vehicle) for at least the first or last leg of the route.

In addition, optimization engine 212 models restrictions associated with constraints 224 and exclusions 226. Restrictions stored in database 220 may provide, for example, that salvage equipment is only routed through one modeled hub. In addition, restrictions may be, for example, that the transit time is zero and the distance is zero or the transit cost is zero from the dekit hub H to the virtual destination. Although, restrictions have been described as particular restrictions, embodiments contemplate any restriction or combination of restrictions associated with, or applied to transportation network 100.

In one embodiment, local search operations 214 (i.e., heuristics) may be based on trial and error. For example, given an instance (F, c) of a transportation optimization problem, where F is some feasible set of solutions and c is a cost mapping, local search operations 214 involves choosing a neighborhood N(x), which maps a solution to a subset of F:

$$N: F \rightarrow 2^F$$

The neighborhood N(x) is searched at a solution x in F for improvements using the logic: improve(x) is true if there exists any y in N(x) such that c(y)<c(x), but is false otherwise. In general local search operations 214 may be summarized as follows:

```
Begin
    x: some initial starting point in F;
    while improve(x)=true
        x=improve(x);
    return x;
End
```

As indicated above, local search operations 214 starts at an initial feasible solution x in F and uses the subroutine improve() to search for a better solution in the neighborhood for the solution. So long as an improved solution exists, the improved solution is adopted and the neighborhood search is repeated for the new solution. When a local optimum is reached, local search operations 214 stops. In addition, or as an alternative, transportation planner 110 determines an initial feasible solution to model.

Figure 3:
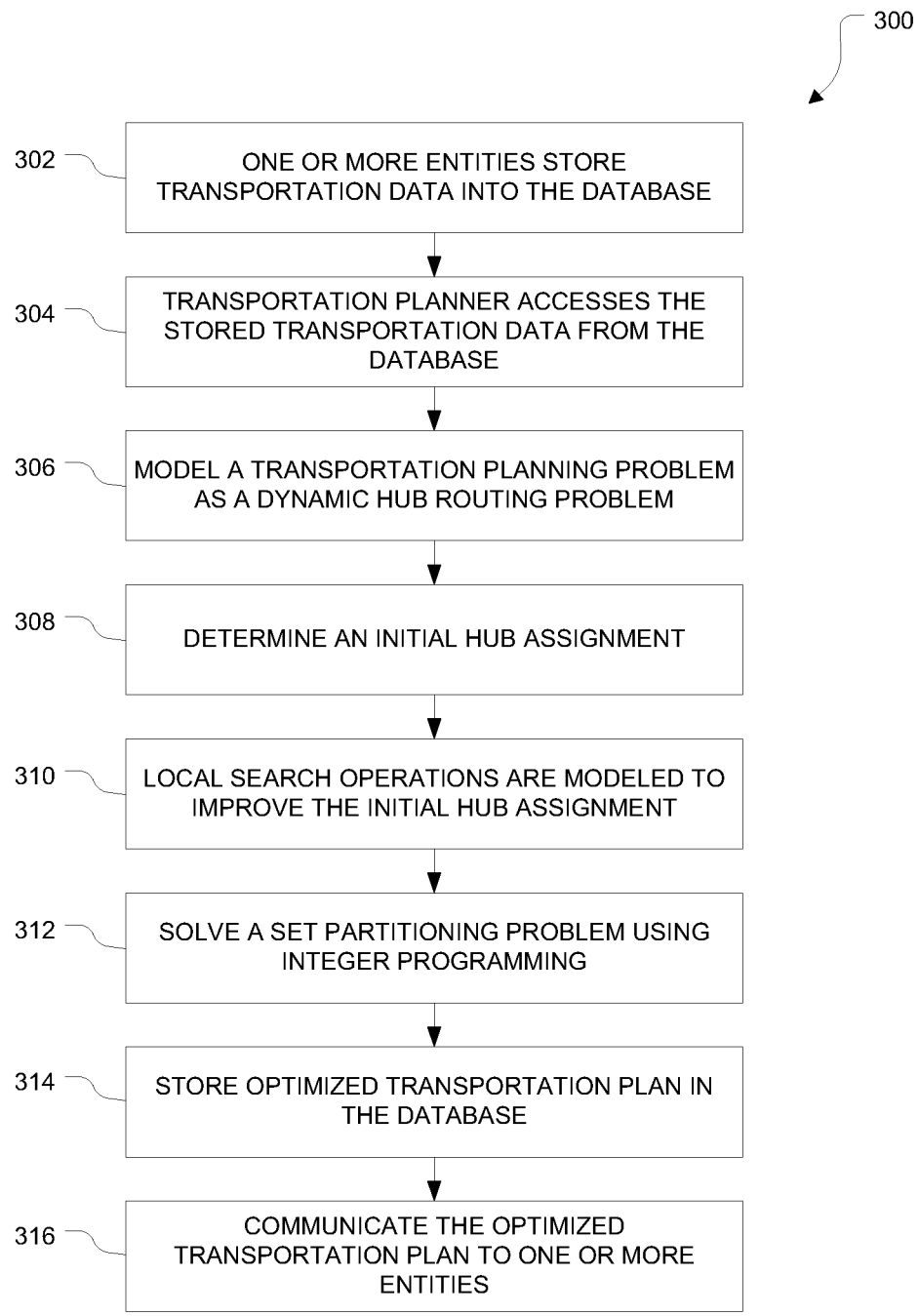
FIG. 3 illustrates an exemplary method for dynamically routing salvage equipment of a transportation network.

FIG. 3 illustrates an exemplary method for dynamically routing salvage equipment associated with transportation network 100. As discussed above, transportation planner 110 generates an optimized transportation plan of a dynamic hub routing problem associated with transportation network 100.

The method begins at step 302, where one or more user computers of transportation planner 110 and/or one or more user computers associated with one or more distribution centers 120, one or more suppliers 130a-130n, one or more stores 140a-140n, and/or one or more dekit locations 150a-150n stores data into database 220. As discussed above, data stored into database 220 may be, for example, transportation data including various constraints, exclusions and/or restrictions associated with transportation network 100. At step 304, transportation planner 110 and in particular server 210 accesses transportation data including various constraints, exclusions and/or restrictions stored in database 220 and models a transportation planning problem for one or more distribution centers 120 as a dynamic hub routing problem.

At step 306, transportation planner 110 and in particular optimization engine 212 models salvage shipments associated with transportation network 100 as a dynamic hub routing problem. At step 308, optimization engine 212 determines an initial hub assignment. As discussed above, optimization engine 212 starts with an initial solution, i.e., an initial hub assignment, and then model different local search operations 214. For example, because the salvage shipments must to go through a hub, a hub may be assigned to the salvage shipments or one or more dekit locations 150a-150n. In addition, or as an alternative, because there are different ways of assigning hubs, for example, the model may assign one or more distribution centers 120, if, for example, most of the salvage shipments are to be brought back to the one or more distribution centers 120 (i.e., a domicile distribution center) or the model may assign one or more dekit locations 150a-150n near one or more stores 140a-140n.

In one embodiment, a hub assignment includes two parameters, a hub sorting order and a list of excluded commodities. For example, given a shipment, a hub assignment may model one of the following as Hub Sorting order:

1. Increasing order of distance from a hub to the origin of the shipment.
2. Increasing order of distance from a hub to the destination of the shipment.
3. Increasing order of total distance from hub to the origin and destination of the shipment.

Hub Assignment(<HubSortingOrder>, <ExcludedCommodityList>)

For each shipment s not routed and not excluded by the commodity list:
Sort hubs by <HubSortingOrder>
  For each hub h:
  i. Split the shipment through the hub by creating two loads, one inbound and one outbound;
  ii. If the shipment is in an merge-in-transit group,
    1. Either the inbound or outbound load is an merge-in-transit load;
    2. For each shipment s2 in the merge-in-transit group and s2 !=s,
      a. Check hub commodity exclusion for hub h and s2;
      b. If allowed,
        i. Split s2 through h;
        ii. Add the appropriate leg to the merge-in-transit load;
      c. Else
        i. Add s2 to the merge-in-transit load;
    3. Optimize the stop sequence of the merge-in-transit load;
  iii. Check Rating and Scheduling; If successful, break;

In addition, or as an alternative, optimization engine 212 may, for a small number of stops, model an exhaustive search to find all possible stop sequences and then model them all to find the best feasible sequence.

At step 310, local search operations 214 are modeled to improve the initial solution, i.e., an initial hub assignment. For example, consolidation operation 214a moves a sequence of stops from one load to another or swaps two sequences of stops between two loads, continuous move operation 214b combines loads into trips, and hub move operation 214c moves shipments from one hub to another and then runs consolidation operation 214a and continuous move operation 214b for the changed loads. Optimization engine 212 generates multiple solutions by varying the initial hub assignments to favor, for example, modeled dekit hubs near one or more stores 140a-140n or one or more distribution centers 120s and/or changing the order of local search operations 214.

In one embodiment, a salvage shipment may be assigned to one or more distribution centers 120, one or more dekit locations 150a-150n, as the initial hub assignment. For example, if one or more distribution centers 120 is assigned then consolidation 214a may be run, then continuous move 214b to find dekit hub opportunities. In addition, or as an alternative, an initial hub assignment may be assigned to a nearby dekit hub, then consolidation 214a may be run, then continuous move 214b, if, for example, the transportation vehicle doesn't have to pick up anything and the transportation vehicle has to go back to the one or more distribution centers 120, in that case hub move 214c may be run again to bring the transportation vehicle back to the one or more distribution centers 120.

In one embodiment, consolidation operation 214a is a type of k-opt operation and includes a move sub-operation to move a sequence of stops from one load to another and a swap sub-operation to swap two sequences of stops between two loads. For example, a load A has drop stops: $[D_1, D_2, \ldots, D_n]$. All drop sequences may be considered $[D_i, D_{i+1}, \ldots, D_j]$ and add corresponding pick stops (P). Without interleaving, the pick sequence will occur before the drop sequence. However, with interleaving, some pick stops may be scheduled after the first drop $D_i$. These may be partitioned into two subsequences using $D_i$ as the divider. For example, if a sequence is PPDPD, it is divided into two subsequences: PP and DPD. In addition, without ignoring LIFO, inserting first subsequence (mostly picks) will determine the insertion point for the second subsequence (mostly drops). However, with ignoring LIFO, insertion of the second subsequence is largely independent of the first subsequence. So a move sub-operation may be denoted by a 6-tuple $(A, B, S_1, S_2, P_1, P_2)$ where $S_1$ and $S_2$ are two subsequences of A to be inserted at positions $P_1$ and $P_2$ of load B respectively. A swap operation can also be denoted by a quadruple $(A, B, S_1, S_2, S_3, S_4)$ where $S_1$ of A is swapped with $S_3$ of B and $S_2$ of A is swapped of $S_4$ of B.

Due to the very large number of possible move and swap operations, consolidation operation 214a may include parameters, such as, for example, MaxOriginDistance, MaxDestinationDistance, MaxNumberOfStops, and MinDistanceSavings to narrow down the search space. For example, a pair of loads will not be considered for move or swap operations if their origins (destinations) are more than MaxOriginDistance (MaxDestinationDistance) apart. MaxNumberOfStops may be used to limit the length of stop sequence in move and swap operations. MinDistanceSavings may be used to eliminate moves and swaps that do not appear sufficiently promising. It is also useful to check if a stop sequence only has a subset of shipments in an merge-in-transit group.

Consolidation operation 214a generates all possible 6-tuples subject to parameters and capacity constraints. Consolidation operation 214a may sort all possible 6-tuples by the decreasing order of distance savings. Then consolidation operation 214a may execute each tuple one by one. If one tuple for loads A and B results in cost savings, its change is accepted; all tuples have either A or B will be removed and new tuples will be created for A and B. Otherwise, the change may be undone.

In another embodiment, continuous move operation 214b may combine loads into trips. Continuous move operation 214b may consider every ordered pair of loads. For an ordered load pair (A, B), its distance savings can be calculated as:

PrepickupDistance(B)−DeadHeadDistance(A,B)+
ReturnDistance(B)−ReturnDistance(A)

where PrepickupDistance(B) is the distance from domicile to the origin of load B and ReturnDistance(B) is the distance from the destination of load B to its domicile.

In addition, or as an alternative, all pairs are sorted first by the decreasing order of distance savings, then sorted by start times of the first and second load. Continuous Move operation 214b may include parameters, such as, for example, MaxDeadHeadDistance, MaxReturnDistance, and MinDistanceSavings. These parameters may be modeled to reduce the search space, thus running times. MaxDeadHeadDistance (MaxReturnDistance) may be modeled to eliminate pairs with large deadhead (return) distance. Continuous move operation 214b may execute each pair one by one. If the resulting trip achieves cost savings, it may be accepted. The process may be continued until no more candidate pair is left.

In another embodiment, a hub move operation 214c may move shipments from one hub to another, optionally run consolidation operation 214a and continuous move operation 214b on changed loads. As an example only, and not by way of limitation, hub move operation 214c may include the following parameters: MaxHubDistance, MaxNumberOfHubsToTry, RunConsolidation and RunContinuousMove. MaxHubDistance may be modeled to eliminate hubs that are more than MaxHubDistance from current hub. RunConsolidation (RunContinuousMove) is a Boolean flag that may determine whether to run Consolidation (continuous move) after hub change operation 214c.

In addition, or as an alternative, hub move operation 214c will go through each shipment. For example, if a shipment s is split through a hub h, hubs within MaxHubDistance of h are sorted by the increasing order of distance to h. For each hub in the list, the shipment is rerouted from h to that hub. If RunConsolidation (RunContinuousMove) is true, then consolidation (continuous move) is run to improve the changed loads. The process is continued until no improvements can be made.

At step 312, optimization engine 212 solves a set-partitioning problem of the merged solutions generated by local operations 214 using integer programming. As discussed above, optimization engine 212 generates multiple solutions by varying the initial hub assignment to favor, for example, modeled dekit hubs near one or more stores 140a-140n or one or more distribution centers 120s and/or changing the order of local search operations 214. In addition, as discussed above, the multiple solutions may be merged into one solution (i.e., merge-in-transit group). However, in order to prevent local search operation 212 from getting stuck in a local minimum, embodiments provide for multiple initial solutions. For example, different parameters in Hub Assignment may lead to different initial hub assignments. Even with the same initial solution, different parameters of local search operations 212 and different running orders may also produce different local minima. For example, if consolidation operation 214 is run first and then continuous move operation 214b is run, the result may be different from running continuous move operation 214b first and then running consolidation operation 214a.

In one embodiment, the multiple solutions may be merged into one solution by solving a set-partitioning problem. For example, let $X_1, \ldots, X_n$ be the set of transportation vehicle trips contained in the solutions and the cost of $X_i$ is $C_i$. In addition, let $T_s$ be the set of transportation vehicle trips that transport shipment s. Thereby, the total transportation cost may be minimized, while each shipment s is covered by one and only one transportation vehicle trip in $T_s$.

The set partitioning problem may be formulated as:

Minimize $\Sigma C_i X_i$
Subject to: $\Sigma X_j = 1$     $X_j$ in $T_s$, for each shipment s
$X_i = 0$ or $1$     for every i That is, for each shipment whether it's a regular shipment or a salvage shipment, the shipment must be covered once, and only once, so that is, for example, the constraints, the sum equals. In addition, all the X's equals the transportation vehicles routes, each transportation vehicle route may have, for example, a cost, because of distance and time differences and the sum of the total cost is minimized. As an example only and not by way of limitation if two transportation vehicle routes overlap, only one may be selected. Embodiments provide for simplifying this particular formulation, because, for example, there may be different carries, different salvage equipment types, etc. In addition, these transportation vehicle routes may have different dependencies, when, for example, routes are split through hubs.

In one embodiment, integer programming 216 may use an integer program solver such as, for example, Cplex, or any other integer program solver, to solve the set-partitioning problem. The integer program may also incorporate constraints that specify minimum and/or maximum number of salvage shipments that may be dropped at a dekit hub. In addition, or as an alternative, because all the Xi's are either zero or one, for each transportation vehicle routing, the route may be selected or it may not be selected. Accordingly, after the integer program is run, the solution from the integer program may be the solution for all the Xi's, that is, each Xi will be one or zero. If the solution is one, for example, then the transportation vehicle route may be utilized, if zero it may be discarded. In addition, server 210 and in particular, optimizer 212 generates an optimized transportation plan of the solved set-partitioning problem using integer programming 216.

At step 314, the optimized transportation plan is stored in database 220. At step 316 server 210 communicates to optimized transportation plan to one or more distribution centers 120, one or more suppliers 130a-130n, one or more stores 140a-140n, one or more dekit locations 150a-150n of transportation network 100. Once the transportation plan has been optimized and communicated to one or more distribution centers 120, one or more suppliers 130a-130n, one or more stores 140a-140n, one or more dekit locations 150a-150n of transportation network 100, the method ends.

Reference in the foregoing specification to "one embodiment", "an embodiment", "another embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system for delivering regular shipments or picking-up salvage shipments at one or more locations of two or more entities in a transportation network, comprising:
a database that stores transportation data describing one or more locations of two or more entities and constraint data associated with the transportation network; and
a computer coupled with the database and configured to:
access the transportation data describing the one or more locations of the two or more entities within the transportation network;
access the constraint data associated with the transportation network, the constraint data describing a capacity of a transportation vehicle associated with regular shipments and salvage shipments;
model a transportation problem for the transportation network, based on at least a portion of the accessed transportation data describing the one or more locations of the two or more entities and the accessed constraint data describing the capacity of a transportation vehicle associated with the regular shipments and the salvage shipments;
determine an initial hub assignment of a virtual hub modeled as zero distance from at least one of the one or more locations of the two or more entities and an infinite distance from any other of the one or more locations of the two or more entities, the initial hub assignment based on the transportation problem and the accessed transportation data describing the one or more locations of the two or more entities within the transportation network;
generate multiple solutions of the initial hub assignment based on a local search operation;
generate an optimized transportation plan by merging the multiple solutions of the initial hub assignment;
communicate the optimized transportation plan to the two or more entities in the transportation network; and
route the transportation vehicle using the optimized transportation plan to one or more locations of the two or more entities in the transportation network to deliver the regular shipments or pick-up salvage shipments, wherein the salvage shipments comprise salvage equipment that is separated from the regular shipments based on the capacity of the transportation vehicle associated with regular shipments and the salvage shipments.

2. The system of claim 1, wherein the transportation problem is modeled as dynamic hub routing problem.

3. The system of claim 1, wherein the local search operation is selected from the group consisting of a consolidation operation, a continuous move operation, and a hub move operation.

4. The system of claim 1, wherein the database further comprises:
transportation data describing business hours of the two or more entities;

constraint data describing a mix of salvage shipments based on the capacity of the transportation vehicle;
exclusion data describing commodity exclusions; and
a strategy file describing configurations.

5. The system of claim 1, wherein the computer models the salvage shipments as a dynamic hub routing problem.

6. The system of claim 1, wherein the salvage shipment is assigned an initial hub assignment.

7. The system of claim 6, wherein the initial hub assignment is improved by a local search operation.

8. A computer-implemented method for delivering shipments or picking-up salvage shipments at one or more locations of two or more entities in a transportation network, comprising:
   accessing transportation data describing the one or more locations of the two or more entities within the transportation network;
   accessing constraint data associated with the transportation network, the constraint data describing a capacity of a transportation vehicle describing the one or more locations of the two or more entities;
   modeling a transportation problem for the transportation network, based on at least a portion of the accessed transportation data describing the one or more locations of the two or more entities and the accessed constraint data describing the capacity of a transportation vehicle associated with the regular shipments and the salvage shipments;
   determining an initial hub assignment of a virtual hub modeled as zero distance from at least one of the one or more locations of the two or more entities and an infinite distance from any other of the one or more locations of the two or more entities, the initial hub assignment based on the transportation problem and the accessed transportation data describing the one or more locations of the two or more entities within the transportation network;
   generating multiple solutions of the initial hub assignment based on a local search operation;
   generating an optimized transportation plan by merging the multiple solutions of the initial hub assignment;
   communicating the optimized transportation plan to the two or more entities in the transportation network; and
   routing the transportation vehicle using the optimized transportation plan to one or more locations of the two or more entities in the transportation network to deliver the regular shipments or pick-up salvage shipments, wherein the salvage shipments comprise salvage equipment that is separated from the regular shipments based on the capacity of the transportation vehicle associated with regular shipments and the salvage shipments.

9. The computer-implemented method of claim 8, wherein the transportation data is data selected from the group consisting of:
   data describing shipments of a transportation vehicle;
   data describing capacity of a transportation vehicle;
   data describing transportation costs;
   data describing transportation rates;
   data describing carriers; and
   data describing lanes.

10. The computer-implemented method of claim 8, wherein the transportation problem is modeled as a dynamic hub routing problem.

11. The computer-implemented method of claim 8, wherein the local search operation selected from the group consisting of a consolidation operation, a continuous move operation, and a hub move operation.

12. The computer-implemented method of claim 11, further comprising:
   storing the optimized transportation plan in a database.

13. A non-transitory computer-readable storage media embodied with software for delivering shipments or picking-up salvage shipments at one or more locations of two or more entities in a transportation network, the software when executed using one or more computers is configured to:
   access transportation data describing the one or more locations of the two or more entities within the transportation network;
   access constraint data associated with the transportation network, the constraint data describing a capacity of a transportation vehicle associated with regular shipments and salvage shipments;
   model a transportation problem for the transportation network, based on at least a portion of the accessed transportation data describing the one or more locations of the two or more entities and the accessed constraint data describing the capacity of a transportation vehicle associated with the regular shipments and the salvage shipments;
   determine an initial hub assignment of a virtual hub modeled as zero distance from at least one of the one or more locations of the two or more entities and an infinite distance from any other of the one or more locations of the two or more entities, the initial hub assignment based on the transportation problem and the accessed transportation data describing the one or more locations of the two or more entities within the transportation network;
   generate multiple solutions of the initial hub assignment based on a local search operation;
   generate an optimized transportation plan by merging the multiple solutions of the initial hub assignment;
   communicate the optimized transportation plan to the two or more entities in the transportation network; and
   route the transportation vehicle using the optimized transportation plan to one or more locations of the two or more entities in the transportation network to deliver the regular shipments or pick-up salvage shipments, wherein the salvage shipments comprise salvage equipment that is separated from the regular shipments based on the capacity of the transportation vehicle associated with regular shipments and the salvage shipments.

14. The non-transitory computer-readable storage media of claim 13, wherein the transportation data is data selected from the group consisting of:
   data describing shipments of a transportation vehicle;
   data describing capacity of a transportation vehicle;
   data describing transportation costs;
   data describing transportation rates;
   data describing carriers; and
   data describing lanes.

15. The non-transitory computer-readable storage media of claim 13, wherein the transportation problem is modeled as a dynamic hub routing problem.

16. The non-transitory computer-readable storage media of claim 13, wherein the local search operation selected from the group consisting of a consolidation operation, a continuous move operation, and a hub move operation.

17. The non-transitory computer-readable storage media of claim 16, wherein the software is further configured to store the optimized transportation plan in a database.

* * * * *